United States Patent
Fishlock et al.

(10) Patent No.: US 12,493,032 B2
(45) Date of Patent: Dec. 9, 2025

(54) LATERAL FLOW IMMUNOASSAY DEVICE

(71) Applicant: University of Ulster, Coleraine (GB)

(72) Inventors: Sam Fishlock, Coleraine (GB); David Steele, Coleraine (GB); James McLaughlin, Coleraine (GB)

(73) Assignee: University of Ulster, Coleraine (GB)

( * ) Notice: Subject to any disclaimer, the term of this patent is extended or adjusted under 35 U.S.C. 154(b) by 1020 days.

(21) Appl. No.: 17/621,894

(22) PCT Filed: Jun. 23, 2020

(86) PCT No.: PCT/EP2020/067449
§ 371 (c)(1),
(2) Date: Dec. 22, 2021

(87) PCT Pub. No.: WO2020/260250
PCT Pub. Date: Dec. 30, 2020

(65) Prior Publication Data
US 2022/0241772 A1    Aug. 4, 2022

(30) Foreign Application Priority Data
Jun. 25, 2019  (GB) .................................... 1909106

(51) Int. Cl.
*B01L 3/00*    (2006.01)
*G01N 33/543*    (2006.01)

(52) U.S. Cl.
CPC ...... *G01N 33/54388* (2021.08); *B01L 3/5023* (2013.01); *B01L 3/502723* (2013.01);
(Continued)

(58) Field of Classification Search
None
See application file for complete search history.

(56) References Cited

U.S. PATENT DOCUMENTS 5,710,005 A * 1/1998 Rittenburg ....... G01N 33/54388
436/514
6,464,939 B1 * 10/2002 Bachand ................ B08B 1/145
600/572
(Continued)

FOREIGN PATENT DOCUMENTS

GB    2483077    2/2012
WO    2010/042355    4/2010

OTHER PUBLICATIONS

International Search Report of corresponding PCT Application No. PCT/EP2020/067449, dated Oct. 8, 2020.
(Continued)

*Primary Examiner* — Neil N Turk
(74) *Attorney, Agent, or Firm* — Gardner, Linn, Burkhart & Ondersma LLP

(57) ABSTRACT

A lateral flow immunoassay device includes a porous test strip, a sampling channel having an inlet at a first end to receive a biomarker and an outlet at a second end, opposite the first end, the outlet communicating with the test strip. The sampling channel has an air vent opening at or adjacent the second end thereof, and a diluent reservoir having an outlet communicating with the test strip. The outlet of the sampling channel and the outlet of the diluent reservoir are sealed by a common removable seal to prevent communication between the sampling channel and the test strip, and the diluent reservoir and the test strip, until the seal is removed.

14 Claims, 2 Drawing Sheets

(52) U.S. Cl.
CPC ..... *B01L 3/5029* (2013.01); *B01L 2300/0825* (2013.01); *B01L 2300/0864* (2013.01)

(56) References Cited

U.S. PATENT DOCUMENTS

| | | | |
|---|---|---|---|
| 6,663,833 | B1 | 12/2003 | Stave et al. |
| 10,073,091 | B2* | 9/2018 | Ding .................. B01L 3/50 |
| 2003/0180815 | A1 | 9/2003 | Rawson et al. |
| 2006/0078986 | A1* | 4/2006 | Ly .................. B01L 3/502746 |
| | | | 435/287.7 |
| 2009/0246078 | A1* | 10/2009 | Barnard ................ G01N 11/10 |
| | | | 422/400 |
| 2019/0317115 | A1 | 10/2019 | MacLean et al. |

OTHER PUBLICATIONS

JK Search Report of corresponding Application No. GB1909106.5, dated Dec. 24, 2019.

* cited by examiner

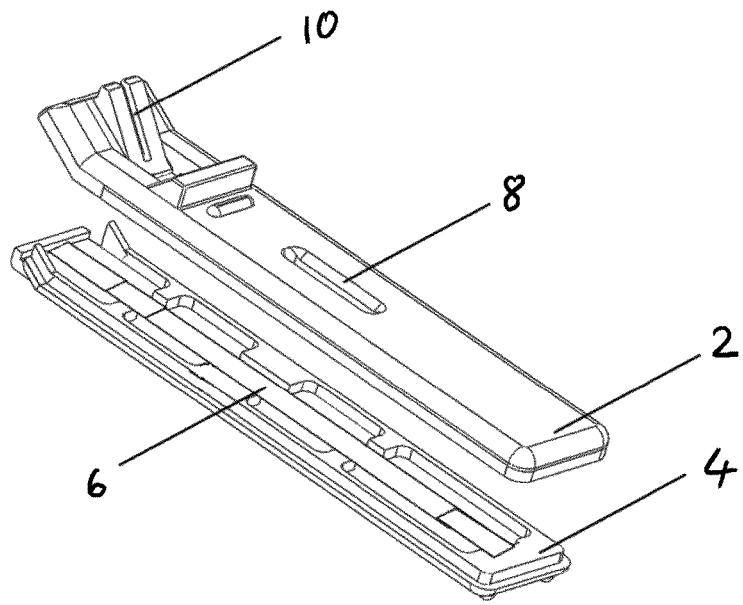
Figure 1
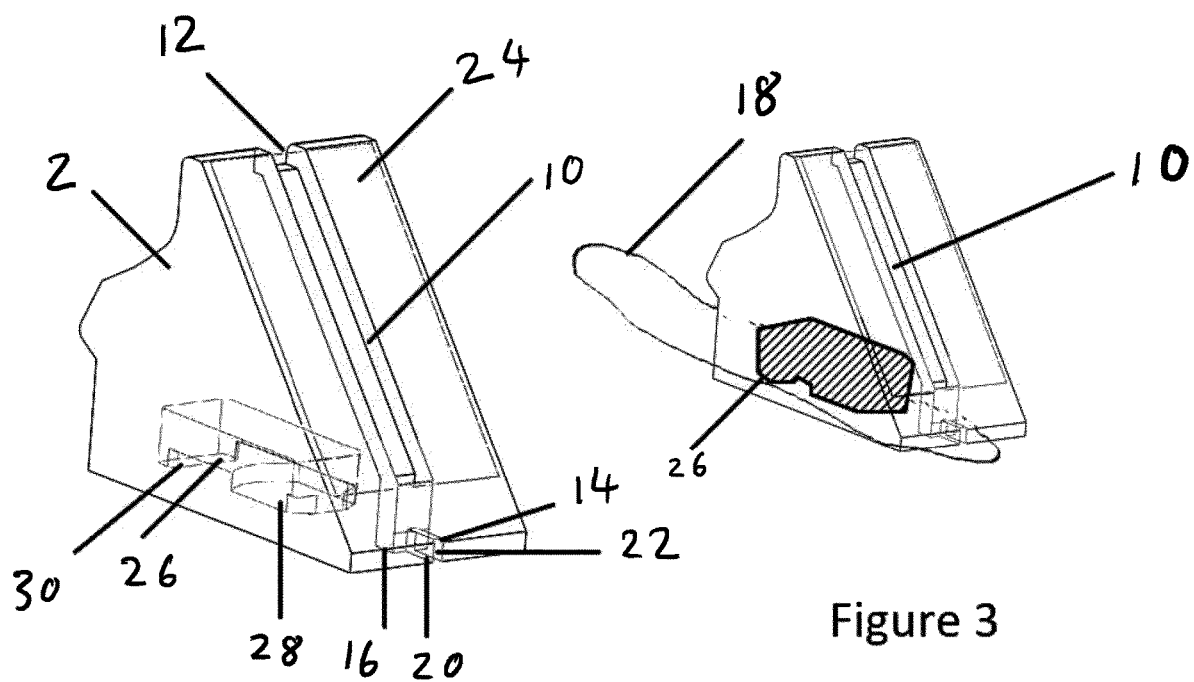
Figure 2
Figure 3

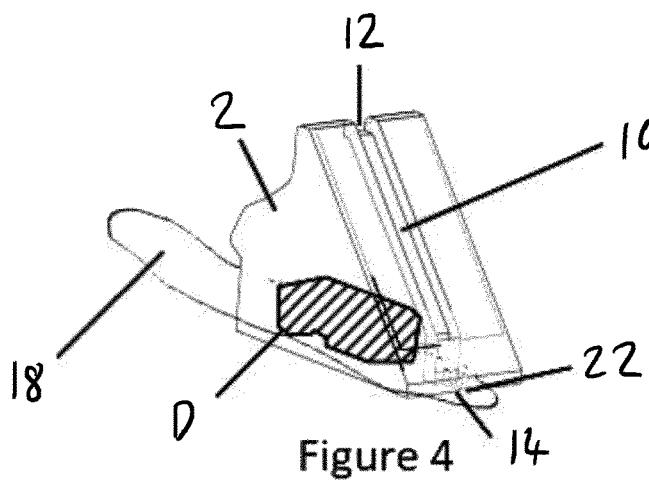
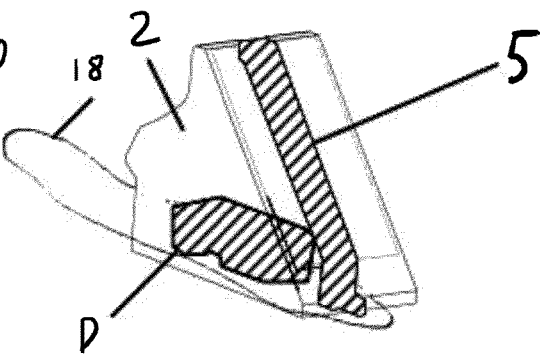
Figure 4   Figure 5
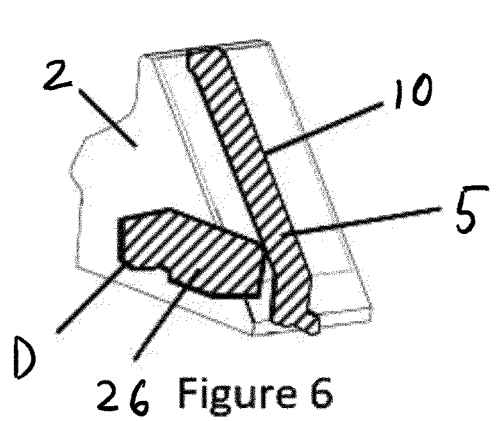
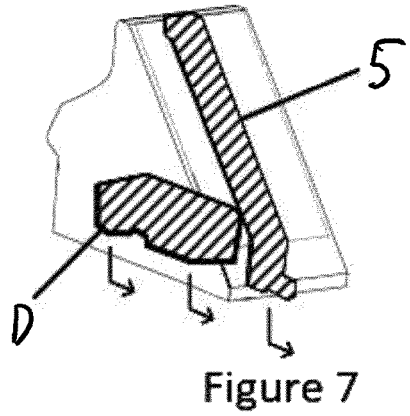
Figure 6   Figure 7
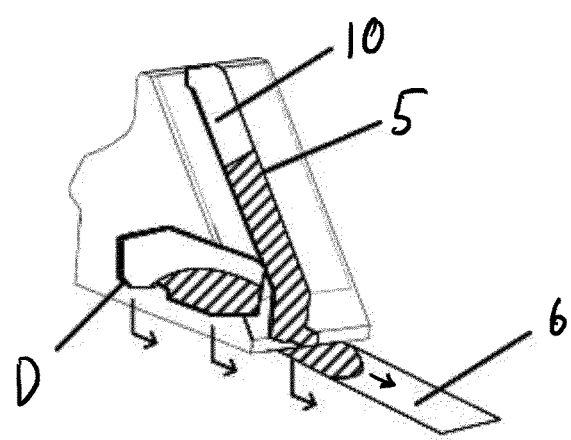
Figure 8

LATERAL FLOW IMMUNOASSAY DEVICE

CROSS REFERENCE TO RELATED APPLICATIONS

The present application is a § 371 national stage of International Application PCT/EP2020/067449, filed Jun. 23, 2020, which claims priority benefit to U.K. Pat. Application Ser. No. 1909106.5, filed Jun. 25, 2019, both of which are hereby incorporated herein by reference in their entireties.

FIELD OF THE INVENTION

This invention relates to a lateral flow immunoassay device.

BACKGROUND OF THE INVENTION

An immunoassay is a biochemical test that measures the presence or concentration or a macromolecule or a small molecule in a solution through the use of an antibody (usually) or an antigen (sometimes). Lateral flow immunoassays (LFAs) can be used for diagnosing diseases at point-of-care. LFAs are intended to detect the presence (or absence) of a target analyte in liquid sample (matrix) without the need for specialized and costly equipment, though many lab-based applications exist that are supported by reading equipment. Typically, LFAs are used for medical diagnostics either for home testing, point of care testing, or laboratory use. A widely spread and well known application is the home pregnancy test.

Typical LFA comprise a series of capillary beds having the capacity to transport fluid (e.g. a biomarker such as blood, saliva or urine) spontaneously. A first capillary bed comprises a sample pad acting as a sponge to hold an excess of sample fluid. Once the first capillary bed is soaked, the sample fluid migrates to a second capillary bed in the form of a conjugate pad in which the manufacturer has stored the so-called conjugate, a dried format of bio-active particles in a salt-sugar matrix, that is selected to provide a chemical reaction between the target molecule (e.g. an antigen) and its chemical partner (e.g. an antibody) that has been immobilized on the particle's surface. The analyte binds to the particles while migrating further through a third capillary bed having one or more areas (often called "stripes" or a "test line") where a third molecule has been immobilized by the manufacturer. By the time the sample-conjugate mix reaches these stripes, analyte has been bound on the particle and the third "capture" molecule binds the complex. After a while, when more and more fluid has passed the stripes, particles accumulate and the stripes change colour to provide a visual indicator which can be used to deduce the identity and/or concentration of the analyte. After passing these reaction zones, the fluid enters the final porous material, comprising a wick, that simply acts as a waste container. The test strip itself is typically contained within a casing/holder.

The source of biomarker for LFAs may be saliva, urine, whole blood, plasma etc. For LFAs using whole-blood (for example obtained by finger-prick lancet) or other matrix as the biomarker source, the patient will often experience discomfort because known LFAs typically require >70 µL of blood to saturate/complete the test, which equals several large drops. LFAs requiring a lower volume of whole blood typically need be diluted with a buffer fluid to ensure that the LFA has sufficient flow volume which adds steps and complexity. The blood volume may need be accurately measured by pipette.

SUMMARY OF THE INVENTION

A lateral flow immunoassay device comprising a porous test strip, a sampling channel having an inlet at a first end to receive a biomarker and an outlet at a second end, opposite the first end, the outlet communicating with the test strip, the sampling channel having an air vent opening at or adjacent the second end thereof, and a diluent reservoir having an outlet communicating with the test strip, wherein the outlet of the sampling channel and the outlet of the diluent reservoir are sealed by a common removable seal to prevent communication between the sampling channel and the test strip and the diluent reservoir and the test strip until the seal is removed.

The sampling channel may have a volume of between 1 µl and 15 µl. In one embodiment the sampling channel has a volume of approximately 5 µl.

The sampling channel may have a cross sectional width of approximately 0.1 mm.

Optionally, the test strip is mounted substantially horizontally, the sampling channel being inclined at an angle to the horizontal such that the first end comprises an upper end of the sampling channel, the second end comprising a lower end of the sampling channel. The sampling channel may be inclined with respect to the test strip at an angle of between 5° and 90°.

The test strip may be located in a housing having an upper part and a lower part, the sampling channel and diluent reservoir being defined in the upper part of the housing. The removable seal may comprise an air and fluid proof barrier adhered to a face of the upper part of the housing to cover the outlets of the sampling channel and diluent reservoir. The removable seal may comprise an adhesive tape or foil. The sampling channel may be formed in a face of the upper part of the housing and is covered by a hydrophilic cover tape, the cover tape defining a wall of the sampling channel. Alternatively the sampling channel may be formed as a bore or enclosed channel within the housing, in which case the housing itself may be made from a hydrophilic material. Alternatively the sampling may comprise an open channel formed in a face of the housing. A viewing window or aperture may be provided in the upper part of the housing for viewing a colour change of the test strip.

The air vent opening of the sampling channel may be partially covered by the removable seal.

The sampling channel may comprise a capillary driven flow channel adapted to wick a predetermined volume of blood and to release the volume of blood, along with diluent from the diluent reservoir, when the seal is removed.

The diluent reservoir includes an air vent opening. The air vent opening of the diluent reservoir may be closed by the removable seal.

These and other objects, advantages and features of the invention will become apparent upon review of the following specification in conjunction with the drawings.

BRIEF DESCRIPTION OF THE DRAWINGS

A lateral flow immunoassay device in accordance with an embodiment of the present invention will now be described, by way of example only, with reference to the accompanying drawings, in which:—

FIG. 1 is an exploded view of a lateral flow immunoassay device in accordance with an embodiment of the present invention;

FIG. 2 is a detailed view of part of the lateral flow immunoassay device of FIG. 1 showing the sampling channel and diluent reservoir thereof;

FIG. 3 is a further detailed view of part of the lateral flow immunoassay device of FIG. 1; and FIGS. 4 to 8 illustrate the use of the lateral flow immunoassay device of FIG. 1.

DETAILED DESCRIPTION OF THE PREFERRED EMBODIMENTS

As illustrated in the drawings, a lateral flow immunoassay device (LFA) in accordance with an embodiment of the present invention comprises a housing having an upper part 2 and a lower part 4 enclosing a substantially horizontally mounted porous LFA absorbent pad or test strip 6 of the type having a series of capillary beds including colour changing stripes to provide a visual indicator which can be used to deduce the identity and/or concentration of an analyte. A viewing window 8 is provided in the upper part 2 of the housing for viewing the colour change of the stripes of the LFA pad or test strip 6 in use.

The upper part 2 of the housing incorporates a sampling channel 10, defining a capillary driven flow channel, the sampling channel 10 being inclined to the horizontal and having an inlet opening 12 at an upper end thereof and an air vent 14 at a lower end such that the sampling channel 10 is adapted to draw a predetermined volume of a biomarker, such as whole blood, plasma, saliva or urine, under capillary action into the sampling channel 10 when the biomarker is exposed to the inlet opening 12 of the sampling channel 10. The volume of the sampling channel 10 may be between 1 µl and 15 µl. In a preferred embodiment the sampling channel 10 has a volume of approximately 5 µl. The sampling channel 10 may have a cross section of minimum ~0.1 mm and bounded by the capillary length l of the fluid droplet ($l=(\gamma/\rho \times g)0.5$ where $\gamma$ is the surface tension, $\rho$ is the density of blood and g is the acceleration due to gravity).

The sampling channel 10 has an outlet opening 16 at a lower end thereof for delivering a biomarker sample 5 contained therein onto the LFA pad or test strip 6. A removable seal 18, such as in the form of an adhesive tape or foil, covers and closes the outlet opening 16 of the sampling channel 10. The removable seal 18 may also cover a portion of the air vent 14 of the sampling channel. As illustrated in FIG. 2, the air vent 14 extends laterally from the outlet opening 16 of the sampling channel 10 and has a first part 20 opening to a lower face of the upper part 2 of the housing and a second part 22 opening to an adjacent side edge, the removable seal 18 engaging the lower face of the upper part 2 to close the first part 20 of the air vent 14 as well as the outlet opening 16 of the sampling channel.

In the embodiment shown, the sampling channel 10 is formed in an upper face of a portion of the upper part 2 of the housing of the device and is covered by a cover slip 24, the coverslip 24 defining one wall of the sampling channel 10. Optionally, the cover slip 24, or at least an inner face thereof, is formed from a hydrophilic material or coating. Alternatively the material of the portion of the upper part 2 of the housing in which the sampling channel 10 is formed may comprise a hydrophilic material and the sampling channel 10 may be defined by a bore in the portion of the upper part 2 of the housing.

The sampling channel 10 may be arranged at an angle to the horizontal such that the average contact angle of the sampling channel 10 is between 5° and 90° to the LFA pad 6.

The upper part 2 of the housing also incorporates a diluent reservoir 26 holding a diluent fluid "D", the diluent reservoir 26 having an outlet opening 28 for delivering the contents of the diluent reservoir 26 to the LFA pad 6. The outlet opening 28 of the diluent reservoir 26 is adjacent the outlet opening of the sampling channel 10 and is closed by the common removable seal 18. The diluent reservoir may be formed in the lower face of the upper part 2 of the housing to which the removable seal 18 is attached.

The outlet openings 16,28 of the sampling channel 10 and the diluent reservoir 26, which both communicate in direct contact with the LFA pad or test strip 6, are thereby sealed by a single, common removable seal 18, which acts as a barrier between the outlets 16,28 and LFA pad 6 until the seal 18 is removed by the user. The removable seal 18 can be an adhesive tab or hermetic foil seal, or other type of flexible seal, but is liquid and airproof. When the seal 18 is removed, both liquids (biomarker "S" and diluent "D") are free to drain in to the LFA absorbent pad 6 band mix with each other, as shown in FIGS. 4 to 8.

The diluent reservoir 26 may also have an air vent 30 closable by the removable seal 18 to facilitate draining of the diluent reservoir 26 when the seal 18 is removed.

The sampling channel 10 has one inlet opening 12, one outlet opening 16 (which is sealed until the removable seal 18 is removed) and one air vent 14 at the lower end of the channel 10 which is only partially sealed by the removable seal 18. The lower face of the portion of the upper part 2 of the housing incorporating the sampling channel 10 and diluent reservoir 26 is sealed by the removable seal 18, while the vertical plane air vent channel opening 22 of the sampling channel 10 is not sealed and remains open to the air.

The hydrophilic nature of the sampling channel 10 may be controlled such that wicking is rapid, but not so rapid and uncontrolled that air bubbles may form. Typically, the desired behaviour, of controlled but rapid wicking, occurs when the surface energy of the sampling channel is such that the average contact angle of the liquid is between approximately 10° and 45° to the sampling channel walls.

The partially sealed design of the air vent 14 of the sampling channel 10 is important because it allows controlled sampling of an exact amount of biomarker liquid, but then traps the biomarker liquid in the sampling channel 10 until the seal 18 is removed. The vertical plane portion 22 of the air vent opening is not covered by the seal 18, which means that the sampling channel 10 is free to wick/imbibe a biomarker, such as blood, without the seal 18 being removed. However, when the sampling channel 10 is filled, the captured sample cannot flow through the air vent 14 into the LFA absorbent pad 6, and the sample may only flow out when the seal 18 is removed, thus doing so simultaneously with the buffer fluid from the diluent reservoir 26. The design also ensures that an exact volume of biomarker is sampled, because when the sampling channel 10 is filled, no more fluid can be added and the amount of fluid collected must equal the volume of the sampling channel.

The sampling channel 10 has one outlet opening 16 (this dimension may be greater than the capillary length of the biomarker being sampled) being closed before the removable seal 18 is removed. If the dimensions of the sampling channel 10 outlet are greater than the capillary length of the liquid then the liquid will flow out under gravity, avoiding any trapping effect that the capillary effect of the sampling channel 10 may cause. Alternatively, the dimension of opening 16 may be below the capillary length of the biomarker but is imbibed by capillary pressure of the absorbent pad 6 of the LFA.

Since both the outlet opening 16 of the sampling channel 10 and outlet opening 28 of the diluent reservoir 26 are covered by the same removable seal 18, both the sampling channel 10 and diluent reservoir 26 drain into the LFA absorbent pad 6 simultaneously when the seal 18 is removed. The position of the biomarker sample "S" from the sampling channel 10 'in front' of the buffer fluid "D" from the diluent reservoir 26 (further along the LFA test absorbent pad 6) maximises the time for the biomarker sample to undergo conjugation reaction.

The invention is not limited to the embodiment described herein but can be amended or modified without departing from the scope of the present invention as defined by the appended claims as interpreted according to the principles of patent law including the doctrine of equivalents.

The invention claimed is:

1. A lateral flow immunoassay device comprising:
   a porous test strip;
   a sampling channel inclined at an angle to said test strip, said sampling channel having an upper end configured to receive a biomarker and a lower end defining an outlet, said outlet communicating with said test strip, said sampling channel having an air vent opening at or adjacent said lower end;
   a diluent reservoir having an outlet communicating with said test strip; and
   a common removable seal for sealing said outlet of said sampling channel and said outlet of said diluent reservoir to prevent communication between said sampling channel and said test strip, and between said diluent reservoir and said test strip, until said common removable seal is removed;
   wherein said air vent opening of said sampling channel is only partially covered by said common removable seal.

2. The lateral flow immunoassay device of claim 1, wherein said sampling channel has a volume of between 1 μl and 15 μl.

3. The lateral flow immunoassay device of claim 2, wherein said sampling channel has a volume of approximately 5 μl.

4. The lateral flow immunoassay device of claim 1, wherein said sampling channel has a cross sectional width of approximately 0.1 mm.

5. The lateral flow immunoassay device of claim 1, wherein said sampling channel is inclined with respect to said test strip at an angle of between 5° and 90°.

6. The lateral flow immunoassay device of claim 1, further comprising a housing having an upper part and a lower part, wherein said test strip is located in said housing, said sampling channel and said diluent reservoir being defined in said upper part of said housing.

7. The lateral flow immunoassay device of claim 6 wherein said common removable seal is adhered to a face of said upper part of said housing to cover said outlets of said sampling channel and said diluent reservoir.

8. The lateral flow immunoassay device of claim 7, wherein said common removable seal comprises an adhesive tape or foil.

9. The lateral flow immunoassay device of claim 6, wherein said sampling channel is formed in a face of said upper part of said housing and is covered by a hydrophilic cover slip, said cover slip defining a wall of said sampling channel.

10. The lateral flow immunoassay device of claim 6, wherein a viewing window or aperture is provided in said upper part of said housing for viewing a colour change of said test strip.

11. The lateral flow immunoassay device of claim 1, wherein said sampling channel comprises a capillary driven flow channel adapted to wick a predetermined volume of blood and to release the volume of blood, along with diluent from said diluent reservoir, when said common removable seal is removed.

12. The lateral flow immunoassay device of claim 1, wherein said diluent reservoir includes an air vent opening.

13. The lateral flow immunoassay device of claim 12, wherein said air vent opening of said diluent reservoir is closed by said common removable seal.

14. The lateral flow immunoassay device of claim 6, wherein said air vent extends laterally from said outlet of said sampling channel and has a first part opening to a lower face of said upper part of said housing and a second part opening to an adjacent side edge, said removable common seal engaging said lower face of said upper part to close said first part of said air vent as well as said outlet opening of said sampling channel.

* * * * *